(12) United States Patent
Pandey et al.

(10) Patent No.: US 10,769,129 B2
(45) Date of Patent: Sep. 8, 2020

(54) EFFICIENT THREAD-SAFE TRACKING OF FUNCTION USAGE IN DISTRIBUTED-PROCESSING SYSTEMS

(71) Applicant: Oracle International Corporation, Redwood Shores, CA (US)

(72) Inventors: Pradip Kumar Pandey, Parker, CO (US); Ira Foster Bindley, Aurora, CO (US); John David Holder, Centennial, CO (US); Brett Weston McGarity, Aurora, CO (US); Jason Michael Rice, Copper Mountain, CO (US)

(73) Assignee: Oracle International Corporation, Redwood Shores, CA (US)

( * ) Notice: Subject to any disclaimer, the term of this patent is extended or adjusted under 35 U.S.C. 154(b) by 218 days.

(21) Appl. No.: 15/908,252

(22) Filed: Feb. 28, 2018

(65) Prior Publication Data
US 2019/0102417 A1    Apr. 4, 2019

Related U.S. Application Data

(60) Provisional application No. 62/566,280, filed on Sep. 29, 2017.

(51) Int. Cl.
| | |
|---|---|
| *G06F 16/23* | (2019.01) |
| *G06F 11/30* | (2006.01) |
| *G06F 16/28* | (2019.01) |
| *G06F 16/22* | (2019.01) |

(52) U.S. Cl.
CPC ........ *G06F 16/2343* (2019.01); *G06F 11/302* (2013.01); *G06F 16/2255* (2019.01); *G06F 16/284* (2019.01)

(58) Field of Classification Search
CPC .................................................. G06F 16/2343
USPC ........................................................... 707/688
See application file for complete search history.

(56) References Cited

U.S. PATENT DOCUMENTS

| | | | | |
|---|---|---|---|---|
| 5,404,488 A * | 4/1995 | Kerrigan | ............... | G06F 16/252 |
| | | | | 711/133 |
| 7,886,175 B1 * | 2/2011 | Venable, Sr. | ........... | G06F 9/542 |
| | | | | 713/400 |
| 10,348,596 B1 * | 7/2019 | Tamkin | .................... | H04L 67/22 |
| 2008/0263529 A1 * | 10/2008 | Beretta | ................... | G06F 8/443 |
| | | | | 717/146 |
| 2012/0222051 A1 * | 8/2012 | Kakulamarri | ........... | G06F 9/544 |
| | | | | 719/328 |
| 2012/0226804 A1 * | 9/2012 | Raja | ....................... | H04L 43/028 |
| | | | | 709/224 |
| 2013/0151811 A1 * | 6/2013 | McKenney | ......... | G06F 16/9014 |
| | | | | 711/221 |
| 2017/0109251 A1 * | 4/2017 | Das | ...................... | G06F 11/3017 |
| 2018/0246671 A1 * | 8/2018 | Arasu | ..................... | G06F 12/08 |
| 2018/0295150 A1 * | 10/2018 | Oikarinen | ............... | H04L 67/42 |
| 2019/0042323 A1 * | 2/2019 | Shotton | ................... | G06F 9/465 |

* cited by examiner

*Primary Examiner* — Syling Yen
(74) *Attorney, Agent, or Firm* — Invoke

(57) ABSTRACT

Techniques for tracking function usage in an enterprise system are provided. The techniques include executing a set of processes in one or more applications on one or more computer systems. Next, a set of threads in each process is used to track, in a hash table stored in memory on a computer system, calls to a set of functions by the process. A thread in the process is then used to update a data store containing usage data for the process with the tracked calls in the hash table.

26 Claims, 5 Drawing Sheets

EFFICIENT THREAD-SAFE TRACKING OF FUNCTION USAGE IN DISTRIBUTED-PROCESSING SYSTEMS

BENEFIT CLAIMS; RELATED APPLICATIONS; INCORPORATION BY REFERENCE

This application claims the benefit of U.S. Provisional Patent Application 62/566,280, filed Sep. 28, 2017, which is hereby incorporated by reference.

TECHNICAL FIELD

The present disclosure relates to distributed-processing systems. In particular, the present disclosure relates to techniques for performing efficient thread-safe tracking of function usage in distributed-processing systems.

BACKGROUND

Enterprise systems typically include thousands to millions of applications, users, and functions used by the applications and users. A given application in an enterprise system may also be deployed across multiple server or operating system instances. Because usage of the enterprise system may be distributed unevenly across the applications or functions, heavily used or critical functions and applications may be targeted for customizations, modifications, testing, improvements, or upgrades. On the other hand, conventional techniques that use logging to track function or application usage may incur overhead that interferes with the performance of the enterprise system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
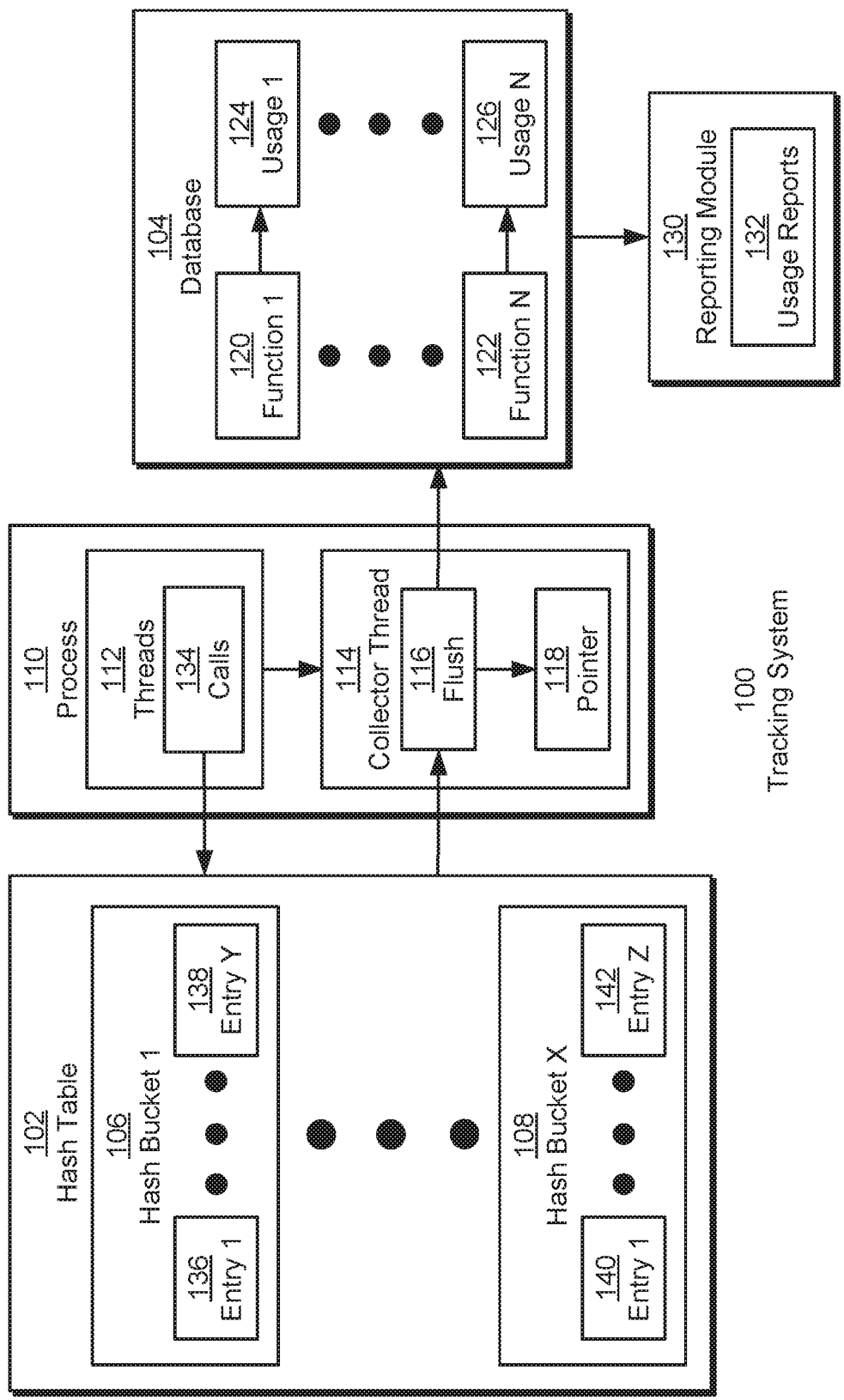
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. THREAD-SAFE TRACKING OF FUNCTION USAGE IN DISTRIBUTED-PROCESSING SYSTEMS
4. TRACKING FUNCTION USAGE IN AN ENTERPRISE SYSTEM
5. USING AN IN-MEMORY HASH TABLE TO TRACK FUNCTION CALLS IN AN ENTERPRISE SYSTEM
6. UPDATING A DATA STORE CONTAINING USAGE DATA FOR A PROCESS WITH TRACKED FUNCTION CALLS IN A HASH TABLE
7. COMPUTER NETWORKS AND CLOUD NETWORKS
8. MISCELLANEOUS; EXTENSIONS
9. HARDWARE OVERVIEW

1. General Overview

An enterprise system may perform tasks and provide services. The tasks and services may be related to, for example, procurement, human resources, manufacturing, customer relationship management, and supply chain management. As a result, the enterprise system may be deployed across multiple server instances and operating systems. The enterprise system may include millions of functions in thousands of applications accessed by thousands of entities (for example, users, customers, organizations, etc.). The entities may utilize the functionality of the enterprise system by calling functions of an Application Programming Interface (API) provided by the enterprise system. A portion of the functions may be customized and modified by an entity to meet the entity's needs. Efficient and effective use of the enterprise system by the entity may be facilitated by improving heavily used functions. For example, the entity's resources can be directed to testing, development, retrofitting, improvement, and customization of the heavily used functions instead of rarely used or unused functions.

To track function usage in the enterprise system, a process in the enterprise system includes a set of threads that track the process's function calls in an in-memory hash table. For example, each thread in the process may update the hash table with function calls made by that thread. When the thread calls a function, the thread may create a key from one or more attributes of the call, use a hash of the key to identify a hash bucket in the hash table, and update a hash entry in the hash bucket with the call.

A collector thread in the process is used to update a data store containing usage data for the process with the tracked calls in the hash table. For example, the collector thread may use counters or other information tracked in the hash table to update a database. To perform the database update, the collector thread may acquire a lock on the hash table and create a new hash table for tracking function calls by the process. The collector thread may then replace a pointer for accessing the hash table by the set of threads with a new pointer to the new hash table. After the lock on the hash table is released by the thread, the collector thread may update the data store with counters for function calls in the hash table.

One or more embodiments described in this Specification or recited in the claims may not be included in this General Overview section.

2. Architectural Overview

FIG. 1 illustrates a system in accordance with one or more embodiments. The system includes a tracking system 100 that tracks usage associated with an enterprise system, application suite, software framework, or other distributed-processing system containing a collection of applications or functions. For example, an enterprise system may perform tasks or provide services related to procurement, human resources, manufacturing, customer relationship management, and supply chain management. As a result, the enterprise system may be deployed across multiple server instances or operating systems. Further, the enterprise system may include millions of functions in thousands of applications accessed by thousands of entities (e.g., users, customers, and organizations).

The entities may utilize the functionality of the enterprise system by calling functions provided by the enterprise system. An entity may also, or instead, customize or modify a portion of the functions to meet the entity's needs. As a result, efficient and effective use of the enterprise system may be facilitated by tracking the entity's usage of functions or other portions of the enterprise system so that the entity's resources can be directed to subsequent testing, development, retrofitting, improvement, or customization of heavily used functions instead of rarely used or unused functions.

In one or more embodiments, tracking system 100 includes functionality to perform efficient, thread-safe tracking of function usage in a distributed-processing system. As shown in FIG. 1, a process 110 in a system containing a collection of applications may include a set of threads 112 that perform calls 134 to functions (e.g., function 1 120, function n 122) in the system. For example, process 110 may make calls 134 to a number of functions in a middleware layer or business logic of an enterprise system or distributed-processing system.

Threads 112 may use a hash table 102 to efficiently track calls 134 made by process 110. Tracking system 100 may store hash table 102 in memory on the computer system on which process 110 executes to reduce latency associated with reading or writing to hash table 102 by threads 112. Moreover, lookup, insertion, or deletion of entries (e.g., entry 1 136, entry y 138, entry 1 140, entry z 142) in one or more hash buckets (e.g., hash bucket 1 106, hash bucket x 108) of hash table 102 may be performed in constant time or near-constant time. Consequently, threads 112 may access hash table 102 with little to no performance overhead, while conventional techniques that use on-disk logging to track usage may cause significant performance issues, errors, or failures in the system.

Process 110 and threads 112 may additionally be configured to track calls 134 to a subset of functions in the system. For example, process 110 and threads 112 may be configured by another component of tracking system 100 to track function calls 134 made to certain modules or applications in the system. In another example, process 110 and threads 112 may omit tracking of calls 134 to other modules or applications on a blacklist. In a third example, processes that access certain parts of the system may be configured to perform tracking of function calls 134, while other processes that access different parts of the system may be configured to omit tracking of function calls 134. Such selective tracking of function usage in the system may allow an entity that uses the system to focus on parts of the system with relatively unknown usage instead of parts that are already known to be frequently used or relatively unused by the entity.

A collector thread 114 may then use calls 134 tracked in hash table 102 to update a database 104 or another data store containing usage data (e.g., usage 1 124, usage n 126) for the corresponding functions. In turn, a reporting module 130 may use records of function usage in database 104 to generate usage reports 132. Such usage reports 132 may allow entities using the distributed-processing system to prioritize testing, development, retrofitting, improvement, or customization of the functions according to the functions' usage.

In one or more embodiments, the system may include more or fewer components than the components illustrated in FIG. 1. For example, hash table 102, process 110, database 104, and reporting module 130 may include, execute with, or exclude one another. Such components may be local to or remote from each other, implemented in software or hardware, or distributed over multiple applications or machines. Multiple components may also be combined into one application or machine. Operations described with respect to one component may instead be performed by another component.

In another example, hash table 102 may be duplicated for each of multiple processes executing in the distributed-processing system. In turn, calls 134 tracked by threads 112 in each process may be used to update a row of database 104 that contains usage data for the process. Because usage data for different processes is maintained in separate hash tables and rows of database 104, collector threads (e.g., collector thread 114) in the processes may concurrently write to database 104 in a way that avoids both locks and conflicts.

Additional embodiments or examples relating to computer networks are described below in Section 6, titled "Computer Networks and Cloud Networks."

In one or more embodiments, a data repository is any type of physical or virtual storage unit or device (e.g., a filesystem, database 104, collection of tables, or any other storage mechanism) for storing data. Further, the data repository may include multiple different storage units or devices. The multiple different storage units or devices may or may not be of the same type or located at the same physical site. The data repository may be implemented or may execute on the same computing system as hash table 102, process 110, or reporting module 130 or on a computing system that is separate from hash table 102, process 110, or reporting module 130. The data repository may be communicatively coupled to hash table 102, process 110, or reporting module 130 via a direct connection or via a network.

In one or more embodiments, tracking system 100 refers to hardware or software configured to perform efficient thread-safe tracking of function usage in a distributed-processing system. Examples of such operations are described below.

In an embodiment, tracking system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver or transmitter, a base station, a communication management device, a router, a switch, a controller, an access point, or a client device.

3. Thread-Safe Tracking of Function Usage in Distribution Processing Systems As mentioned above, function calls 134 by process 110 may be tracked by threads that make the function calls 134. Thus, when a thread (e.g., threads 112) in process 110 calls a function that is to be tracked by tracking system 100, the thread may record the call in one or more entries (e.g., entry 1 136, entry y 138, entry 1 140, entry z 142) of hash table 102.

First, the thread may use one or more attributes associated with the call as one or more keys to access hash table 102. For example, the thread may concatenate a function name, module name, and application name associated with the call into a string and calculate a hash of the string. The thread may then use the hash as an index into a hash bucket (e.g., hash bucket 1 106, hash bucket x 108) in the hash table. The hash function or number of hash buckets in hash table 102 may be selected to accommodate the number of functions tracked in process 110 or processor or memory constraints associated with process 110 or tracking system 100.

Next, the thread may update an entry in hash table 102 with the function call. Continuing with the previous example, the thread may acquire a lock on hash table 102 after locating the entry representing the function call in the hash bucket. During the lock, the thread may increment a counter for the function call in an entry of the hash bucket. After the counter is incremented, the thread may release the lock.

The thread may also use some or all of the same function call attributes used to access the hash bucket to resolve collisions within the hash bucket. Continuing with the previous example, the thread may use the concatenated function name, module name, and application name as an index for resolving the entry representing the function call in the hash bucket prior to obtaining the lock and incrementing the counter stored in the entry. If the concatenated function name, module name, and application name do not match an existing entry in the hash bucket, the thread may acquire the lock, add the entry to the hash bucket, set the counter in the entry to 1, and release the lock.

A collector thread 114 in process 110 may flush 116 counters and other information in hash table 102 to a database 104. For example, collector thread 114 may be a non-application thread that executes flush 116 while other threads 112 in process 110 execute and track calls 134 to functions in one or more applications in the system.

Collector thread 114 may perform flush 116 after the other threads 112 have executed for a pre-specified period or during periods of lower load on the system. For example, collector thread 114 may be configured to trigger flush 116 for process 110 on a periodic (e.g., hourly) basis in an interactive application. In another example, collector thread 114 in a batch-processing application may be configured to trigger flush 116 after the batch-processing application has finished executing a batch. In a third example, collector thread 114 may defer flush 116 until the load on the system or processing by other threads 112 in process 110 is reduced.

During flush 116, collector thread 114 may obtain a lock on hash table 102. While the lock is in place, collector thread 114 may instantiate a new in-memory hash table and replace a pointer 118 used by threads 112 to access hash table 102 with a pointer to the new hash table. The updated pointer 118 may cause the new hash table to replace hash table 102 as the structure that is used to track calls 134 by threads 112 in process 110. After pointer 118 is updated, collector thread 114 may release the lock to allow other threads 112 to update the new hash table with records of calls 134 while collector thread 114 completes flush 116.

Collector thread 114 may then aggregate counters and other data in the old hash table 102 into one or more records in database 104. For example, collector thread 114 may propagate counts of function calls 134 tracked in hash table 102 to records containing usages (e.g., usage 1 124, usage n 126) of functions in the system.

Database 104 may additionally be configured to enable concurrent, lock-free access by collector thread 114 in process 110 and other processes in the system. For example, collector thread 114 may use one or more identifiers for process 110, a software product to which process 110 belongs, or a computer system on which process 110 executes as a key for accessing one or more rows in a relational database 104. Because each process has a separate hash table 102 and set of database rows for tracking function usage in the system, collector thread 114 may perform writes to database 104 without acquiring a lock or conflicting with writes to database 104 by collector threads for other processes in the system.

Finally, a reporting module 130 in tracking system 100 may generate one or more usage reports 132 from records of function usage in database 104. For example, reporting module 130 may aggregate, on an offline, periodic, or near-real-time basis, usage data associated with multiple processes or machines in the system into a single set of usage statistics (e.g., count, maximum, minimum, distribution, average, median, percentile, etc.) for all functions associated with a given module, application, or entity. Reporting module 130 may then include the usage statistics in a file, document, spreadsheet, webpage, database record, or other format associated with usage reports 132. Reporting module 130 may optionally include individual counts or other usage data for specific computer systems, processes, or other dimensions associated with the entity in usage reports 132. In turn, the entity may use information in usage reports 132 to identify functions, modules, or applications in the system that are important or critical to the entity's needs. The entity may then allocate resources to perform customization, retrofitting, testing, scaling, or other maintenance or improvement related to critical components of the system.

By tracking calls 134 using an in-memory, per-process hash table 102 and minimizing locks on hash table 102 by threads (e.g., threads 112, collector thread 114) in process 110, tracking system 100 may perform efficient, thread-safe tracking of function usage in a distributed-processing system. In turn, usage data generated by tracking system 100 may allow entities that use the distributed-processing system to target important or critical parts of the distributed-processing system for development, deployment, or maintenance. Consequently, tracking system 100 may improve the development, maintenance, and use of distributed-processing systems by the entities, as well as execution of applications or computer systems that implement the distributed-processing systems or track function usage in the distributed-processing systems.

4. Tracking Function Usage in an Enterprise System

Figure 2:
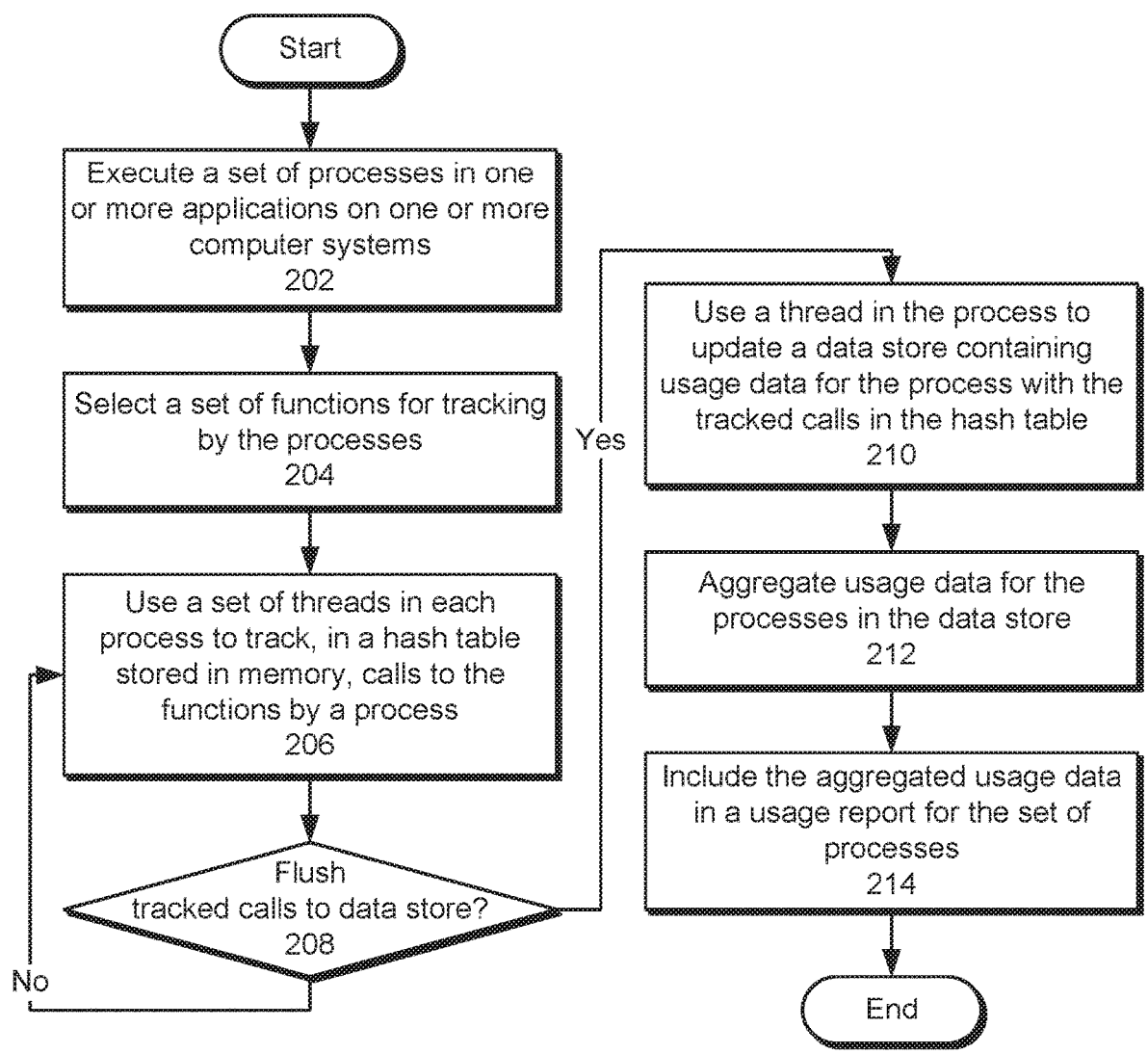
FIG. 2 illustrates a flowchart of tracking function usage in an enterprise system in accordance with one or more embodiments.

FIG. 2 illustrates a flowchart of tracking function usage in an enterprise system in accordance with one or more embodiments. In one or more embodiments, one or more of the steps may be omitted, repeated, or performed in a different order. Accordingly, the specific arrangement of steps shown in FIG. 2 should not be construed as limiting the scope of the embodiments.

Initially, a tracking system executes a set of processes in one or more applications on one or more computer systems (operation 202). For example, the processes may be used to implement or access a distributed-processing system such as an enterprise system. Next, the tracking system selects a set of functions for tracking by the processes (operation 204). For example, the tracking system may obtain or provide functions to be tracked by the processes in a whitelist that is provided to the processes. In another example, the tracking system may obtain or provide functions to be excluded from tracking by the processes in a blacklist that is provided to the processes. In a third example, the tracking system may maintain the whitelist or blacklist separately from tracking of function usage by the processes. The tracking system may then use the whitelist or blacklist to subsequently filter usage data generated by the processes.

A set of threads in each process then tracks, in a hash table stored in memory, calls to a set of functions by the process (operation 206). Using in-memory hash tables to track function calls by processes is described in further detail below with respect to FIG. 3.

The process may also flush tracked calls in the hash table to a data store (operation 208). For example, the process may update the data store with the tracked calls periodically or based on system load. When a flush is triggered, a thread in the process is used to update a data store containing usage data for the process with the tracked calls in the hash table (operation 210). For example, the thread may be a non-application collector thread that flushes the hash table to the data store. The collector thread may perform flushing on a periodic basis for an interactive application or after a batch-processing application has finished executing a batch. Updating data stores containing usage data for processes with tracked calls in hash tables is described in further detail below with respect to FIG. 4.

Finally, the tracking system aggregates usage data for the processes in the data store (operation 212). The tracking system also includes the aggregated usage data in a usage report for the set of processes (operation 214). For example, the tracking system may aggregate counts of function calls by individual processes in the data store into overall counts of the function calls for a given module, application, or entity associated with the distributed-processing system. The tracking system may optionally filter the overall counts using a whitelist or blacklist of functions. In turn, the tracking system may include the overall counts in the usage report to facilitate subsequent development, maintenance, improvement, or use of the distributed-processing system by the entity. For example, the entity may use the usage report to track business logic usage in an enterprise system and allocate resources for testing, retrofitting, or customizing functions to heavily used or important parts of the enterprise system.

Figure 3:
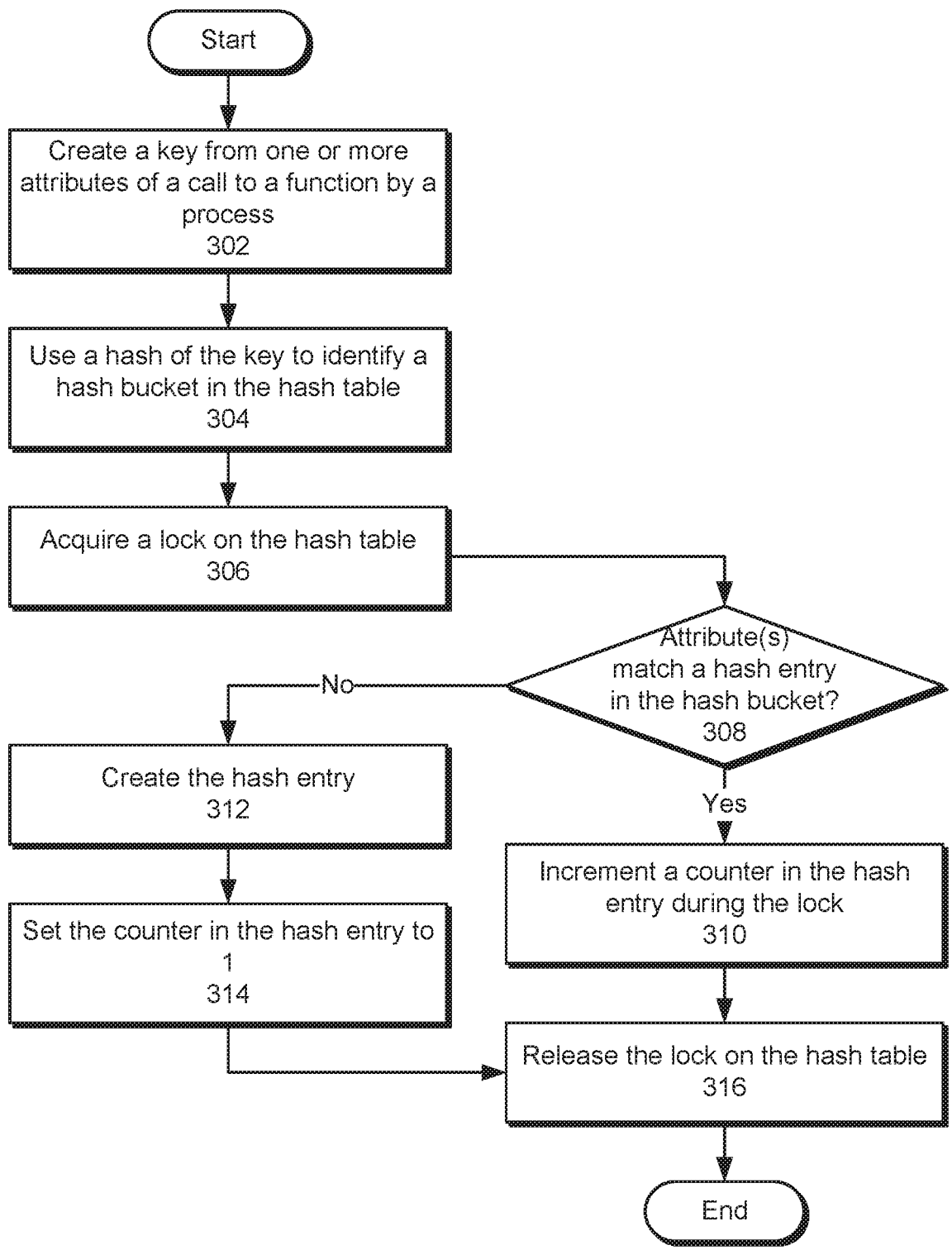
FIG. 3 illustrates a flowchart of using an in-memory hash table to track function calls in an enterprise system in accordance with one or more embodiments.

5. Using an In-Memeory Hash Table to Track Function Calls in an Enterprise System FIG. 3 illustrates a flowchart of using an in-memory hash table to track function calls in an enterprise system in accordance with one or more embodiments. In one or more embodiments, one or more of the steps may be omitted, repeated, or performed in a different order. Accordingly, the specific arrangement of steps shown in FIG. 3 should not be construed as limiting the scope of the embodiments.

Initially, a thread in a process creates a key from one or more attributes of a call to a function by the process (operation 302). For example, the thread that makes the call may concatenate or otherwise combine a function name, module name, and application name associated with the call into a string and calculate a hash of the string. Next, the thread uses a hash of the key to identify a hash bucket in the hash table (operation 304). The thread also acquires a lock on the hash table (operation 306).

The thread may further match the same attribute(s) to a hash entry representing the function in the hash bucket (operation 308). For example, the thread may use the key as an index to the hash bucket in the hash table. After the hash bucket is identified, the thread may use the unhashed attributes as an index to the hash entry within the hash bucket.

If a hash entry matching the attribute(s) is found, the thread increments a counter in the hash entry during the lock (operation 310). If the hash entry isn't found in the hash bucket, the thread creates the hash entry (operation 312) and set the counter in the hash entry to 1 (operation 314). Finally, the thread releases the lock on the hash table (operation 316) to allow other threads to update the hash table with their respective function calls.

Figure 4:
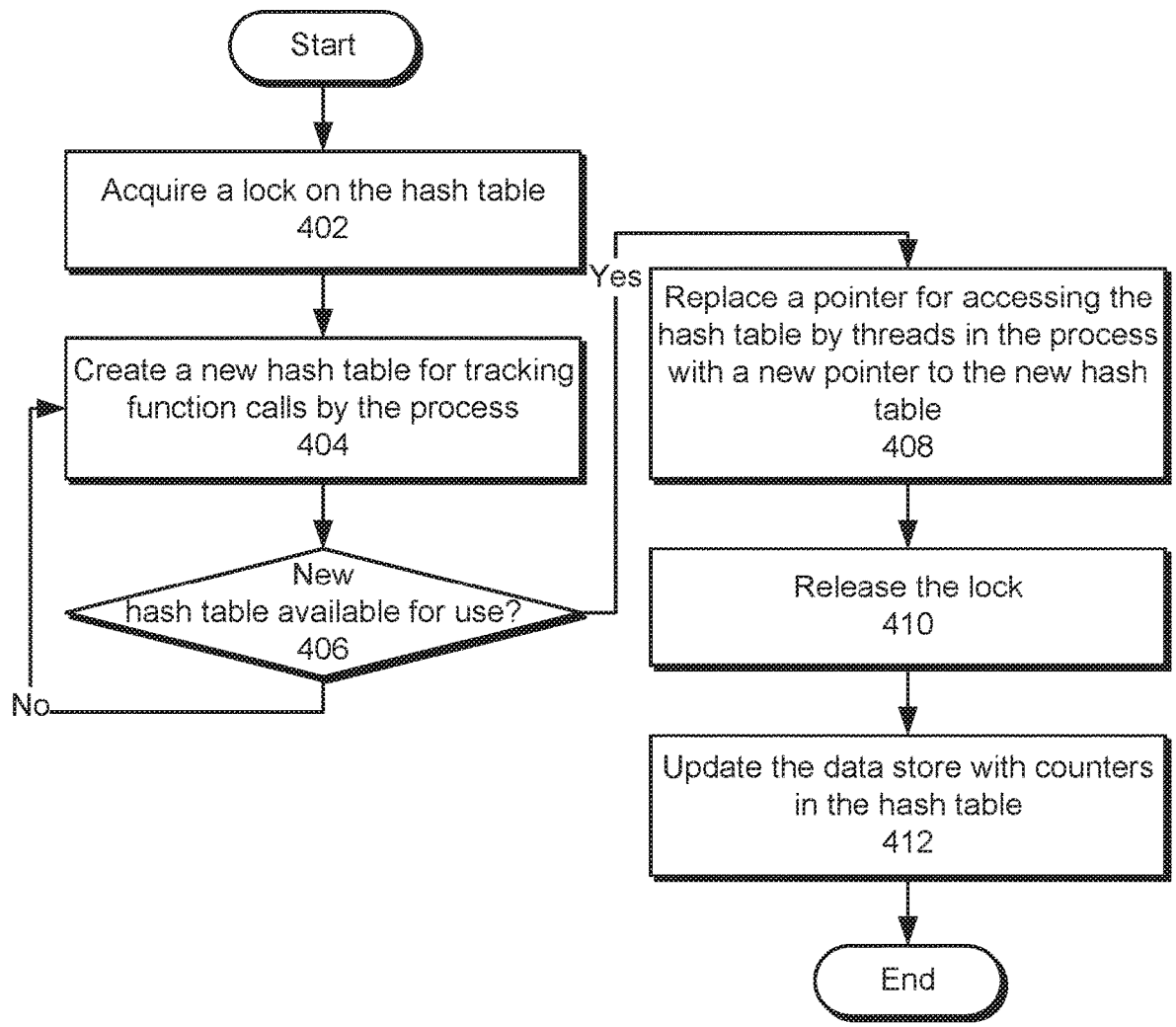
FIG. 4 illustrates a flowchart of updating a data store containing usage data for the process with tracked function calls in a hash table in accordance with one or more embodiments.

6. Updating a Data Store Containing Usage Data for a Process with Tracked Function Calls in a Hash Table FIG. 4 illustrates a flowchart of updating a data store containing usage data for the process with tracked function calls in a hash table in accordance with one or more embodiments. In one or more embodiments, one or more of the steps may be omitted, repeated, or performed in a different order. Accordingly, the specific arrangement of steps shown in FIG. 4 should not be construed as limiting the scope of the embodiments.

As mentioned above, the data store may be updated by a collector thread in the process. To update the data store with tracked calls in the hash table, the collector thread first obtains a lock on the hash table (operation 402) to prevent additional writing to the hash table by other threads in the process. Next, the collector thread creates a new hash table for tracking the calls to the functions by the process (operation 404). For example, the collector thread may allocate the new hash table in memory on the same computer system as the existing hash table. The process may continue to create the new hash table until the new hash table is available for use (operation 406).

Once the new hash table can be used to store data, the collector thread replaces a pointer used by the threads to access the hash table with a new pointer to the new hash table (operation 408). For example, the collector thread may update a memory address or data structure storing the pointer with the value of the new pointer. The updated pointer may cause the new hash table to replace the old hash table as the structure that is used to track function calls by threads in the process.

The collector thread then releases the lock (operation 410) to allow other threads in the process to update the new hash table with function calls made after the lock is taken. After the lock is released, the collector thread updates the data store with counters in the hash table (operation 412). For example, the collector thread may update a relational database row for the process with counts of function calls tracked in the hash table.

7. Computer Networks and Cloud Networks

In one or more embodiments, a computer network provides connectivity among a set of nodes. The nodes may be local to or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process or a server process. A client process makes a request for a computing service (such as execution of a particular application or storage of a particular amount of data). A server process responds by executing the requested service and returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device or a software process (such as, a virtual machine, an application instance, or a thread). A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application-programming interface (API).

In an embodiment, a computer network provides connectivity between clients and network resources. Network resources include hardware or software configured to execute server processes. Examples of network resources include a processor, a data storage, a virtual machine, a container, or a software application. Network resources are shared amongst multiple clients. Clients request computing services from a computer network independently of each other. Network resources are dynamically assigned to the requests or clients on an on-demand basis. Network resources assigned to each request or client may be scaled up or down based on, for example, (a) the computing services requested by a particular client, (b) the aggregated computing services requested by a particular tenant, or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times or at the same time. The network resources may be local to or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, or consistency. The same computer network may need to implement different network requirements demanded by different tenants.

In one or more embodiments, in a multi-tenant computer network, tenant isolation is implemented to ensure that the applications or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure or dataset, stored by the computer network, is tagged with a tenant ID. A tenant is permitted access to a particular application, data structure, or dataset only if the tenant and the particular application, data structure, or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Miscellaneous; Extensions

Embodiments are directed to a system with one or more devices that include a hardware processor and that are configured to perform any of the operations described herein or recited in any of the claims below.

In an embodiment, a non-transitory computer readable storage medium comprises instructions which, when executed by one or more hardware processors, causes performance of any of the operations described herein or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired or program logic to implement the techniques.

Figure 5:
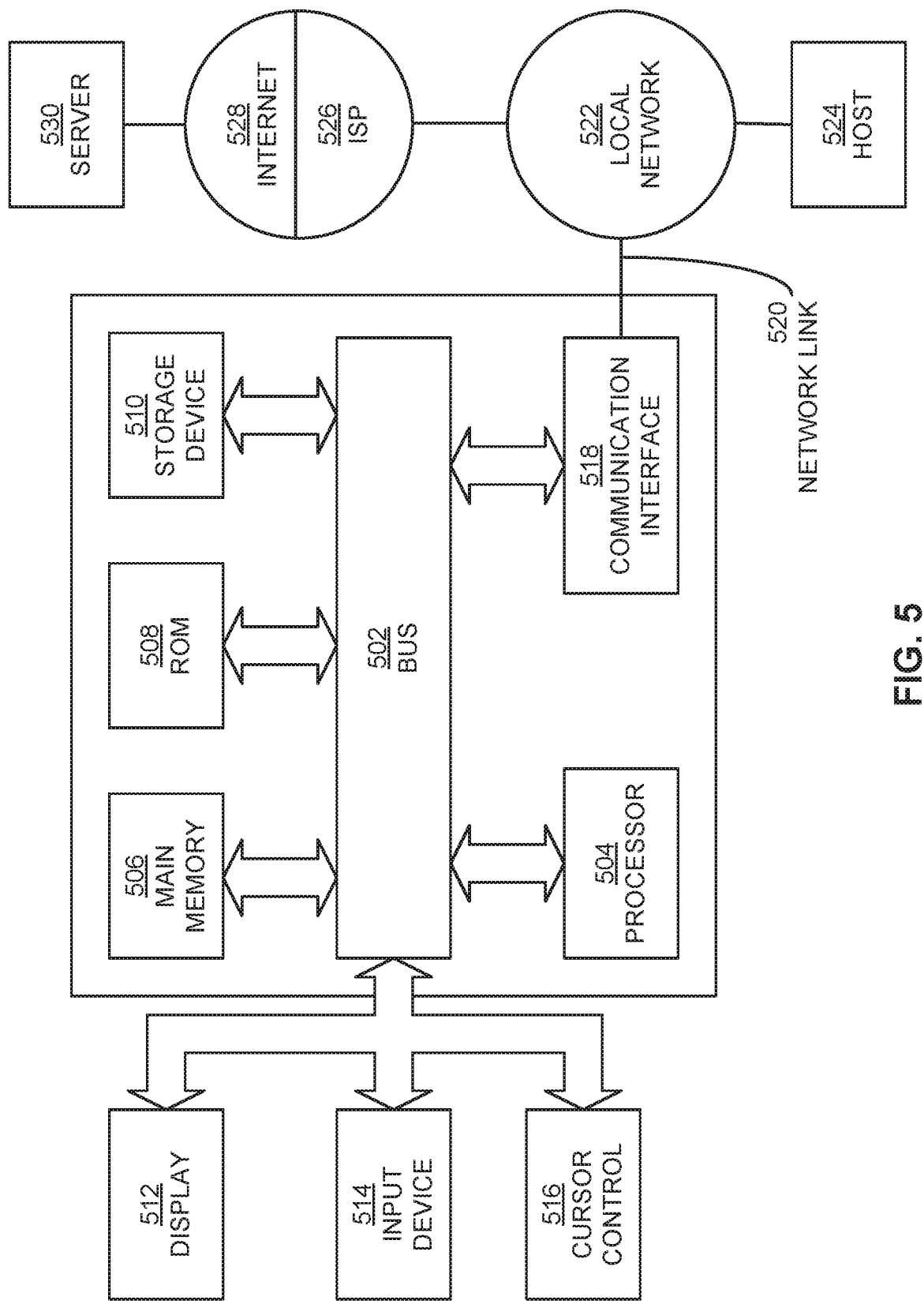
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data or instructions that cause a machine to operate in a specific fashion. Such storage media may comprise non-volatile media or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:

executing a set of processes in one or more applications on one or more computer systems; and for each process in the set of processes:

executing a set of threads in the process that perform calls to a set of functions in a distributed-processing system;

when a thread in the set of threads performs a call to a function in the set of functions, identifying a hash entry representing the function in a hash table;

recording the call in the hash entry representing the function by incrementing a counter in the hash entry, wherein different hash entries respectively store counters for different functions among the set of functions; and using a collector thread in the process to update a data store containing usage data for the process with values of the counters for the calls to the set of functions.

2. The medium of claim 1, wherein the operations further comprise:

aggregating the usage data for the process with additional usage data for other processes in the data store; and
including the aggregated usage data in a usage report for the set of processes.

3. The medium of claim 1, wherein the operations further comprise:
selecting the set of functions for tracking by the set of threads.

4. The medium of claim 3, wherein selecting the set of functions for tracking by the set of threads comprises:
excluding an additional set of functions in the one or more applications from tracking by the set of threads.

5. The medium of claim 1, wherein identifying the hash entry representing the function comprises:
creating a key from one or more attributes of the call; and
using a hash of the key as an index into a hash bucket in the hash table.

6. The medium of claim 5, wherein recording the call in the hash entry representing the function comprises:
mapping the function to the hash bucket having one or more hash entries; and
using the one or more attributes to identify the hash entry, among the one or more hash entries, in the hash bucket.

7. The medium of claim 5, wherein recording the call in the hash entry representing the function comprises:
acquiring a lock on the hash table; and
incrementing the counter in the hash entry during the lock.

8. The medium of claim 5, wherein the one or more attributes comprise at least one of:
the function;
a module; and
an application.

9. The medium of claim 1, wherein using the collector thread to update the data store with the counters for the calls to the set of functions in the hash entries of the hash table comprises:
after a lock on the hash table is acquired by the collector thread:
creating a new hash table for tracking the calls to the set of functions by the set of threads in the process; and
replacing a first pointer for accessing the hash table by the set of threads with a second pointer to the new hash table prior to releasing the lock; and
after the lock on the hash table is released by the thread, updating the data store with the counters in the hash entries of the hash table.

10. The medium of claim 1, wherein using the collector thread to update the data store with the counters for the calls to the set of functions in the hash entries of the hash table comprises:
flushing the counters in the hash table to the data store after a batch-processing application in the one or more applications has finished executing a batch.

11. The medium of claim 1, wherein the data store comprises a relational database.

12. The medium of claim 11, wherein using the collector thread to update the data store with the counters for the calls to the set of functions in the hash entries of the hash table comprises:
updating a database row for the process with the counters for the calls in the hash table.

13. A method, comprising:
executing a set of processes in one or more applications on one or more computer systems; and
for each process in the set of processes:
executing a set of threads in the process that perform calls to a set of functions in a distributed-processing system;
when a thread in the set of threads performs a call to a function in the set of functions, identifying a hash entry representing the function in a hash table;
recording the call in the hash entry representing the function by incrementing a counter in the hash entry, wherein different hash entries respectively store counters for different functions among the set of functions; and
using a collector thread in the process to update a data store containing usage data for the process with values of the counters for the calls to the set of functions.

14. The method of claim 13, further comprising:
aggregating the usage data for the process with additional usage data for other processes in the data store; and
including the aggregated usage data in a usage report for the set of processes.

15. The method of claim 13, wherein identifying the hash entry representing the function comprises:
creating a key from one or more attributes of the call; and
using a hash of the key as an index into a hash bucket in the hash table.

16. The method of claim 15, wherein recording the call in the hash entry representing the function comprises:
using a concatenation of a function name, a module name, and an application name in the one or more attributes as an index to the hash entry in the hash bucket;
acquiring a lock on the hash table; and
incrementing the counter in the hash entry during the lock.

17. The method of claim 13, wherein using the collector thread to update the data store with the counters for the calls to the set of functions in the hash entries of the hash table comprises:
after a lock on the hash table is acquired by the collector thread:
creating a new hash table for tracking the calls to the set of functions by the set of threads in the process; and
replacing a first pointer for accessing the hash table by the set of threads with a second pointer to the new hash table prior to releasing the lock; and
after the lock on the hash table is released by the thread, updating the data store with the counters in the hash entries of the hash table.

18. An apparatus, comprising:
one or more processors; and
memory storing instructions that, when executed by the one or more processors, cause the apparatus to:
execute a set of processes in one or more applications on one or more computer systems; and
for each process in the set of processes:
execute a set of threads in the process that perform calls to a set of functions in a distributed-processing system;
when a thread in the set of threads performs a call to a function in the set of functions, identifying a hash entry representing the function in a hash table;
record the call in the hash entry representing the function by incrementing a counter in the hash entry, wherein different hash entries respectively store counters for different functions among the set of functions; and use a collector thread in the process to update a data store containing usage data for the process with the values of the counters for the calls to the set of functions.

19. The apparatus of claim 18, wherein the memory further stores instructions that, when executed by the one or more processors, cause the apparatus to:
aggregate the usage data for the process with additional usage data for other processes in the data store; and
include the aggregated usage data in a usage report for the set of processes.

20. The medium of claim 1, wherein using the collector thread in the process to update the data store with the counters for the calls to the set of functions in the hash entries of the hash table comprises:
periodically flushing, to the data store, the counters in the hash table for an interactive application in the one or more applications.

21. The medium of claim 1, wherein the operations further comprise:
comparing a first counter from among the counters with a second counter from among the counters to determine a more heavily-used function among the set of functions.

22. The medium of claim 21, wherein the operations further comprise:
determining the first counter to be the more heavily-used function between the first counter and the second counter;
determining that the first counter corresponds to a first function; and
selecting the first function for improvement.

23. The method of claim 13, further comprising:
comparing a first counter from among the counters with a second counter from among the counters to determine a more heavily-used function among the set of functions.

24. The method of claim 23, further comprising:
determining the first counter to be the more heavily-used function between the first counter and the second counter;
determining that the first counter corresponds to a first function; and
selecting the first function for improvement.

25. The apparatus of claim 18, wherein the instructions further cause the apparatus to:
compare a first counter from among the counters with a second counter from among the counters to determine a more heavily-used function among the set of functions.

26. The apparatus of claim 25, wherein the instructions further cause the apparatus to:
determine the first counter to be the more heavily-used function between the first counter and the second counter;
determine that the first counter corresponds to a first function; and
select the first function for improvement.

* * * * *

UNITED STATES PATENT AND TRADEMARK OFFICE
CERTIFICATE OF CORRECTION

PATENT NO. : 10,769,129 B2
APPLICATION NO. : 15/908252
DATED : September 8, 2020
INVENTOR(S) : Pandey et al.

Page 1 of 1

It is certified that error appears in the above-identified patent and that said Letters Patent is hereby corrected as shown below:

In the Specification

In Column 1, Line 9, delete "Sep. 28," and insert -- Sep. 29, --, therefor.

In Column 7, Line 60, delete "In-Memeory" and insert -- In-Memory --, therefor.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*